United States Patent
Pau et al.

(10) Patent No.: US 9,910,864 B2
(45) Date of Patent: Mar. 6, 2018

(54) METHOD FOR OBJECT RECOGNITION, CORRESPONDING SYSTEM, APPARATUS AND COMPUTER PROGRAM PRODUCT

(71) Applicant: STMicroelectronics S.r.l., Agrate Brianza (IT)

(72) Inventors: Danilo Pietro Pau, Sesto San Giovanni (IT); Davide Mazzini, Sondrio (IT); Raimondo Schettini, Milan (IT); Simone Bianco, Cesano Boscone (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 241 days.

(21) Appl. No.: 14/602,113

(22) Filed: Jan. 21, 2015

(65) Prior Publication Data
US 2015/0205792 A1   Jul. 23, 2015

(30) Foreign Application Priority Data
Jan. 22, 2014   (IT) .............................. TO2014A0040

(51) Int. Cl.
G06F 17/30   (2006.01)
G06K 9/46   (2006.01)
G06T 7/90   (2017.01)

(52) U.S. Cl.
CPC ....... *G06F 17/3025* (2013.01); *G06K 9/4671* (2013.01); *G06T 7/90* (2017.01); *G06T 2207/10024* (2013.01)

(58) Field of Classification Search
None
See application file for complete search history.

(56) References Cited

U.S. PATENT DOCUMENTS

| 8,983,941 B1 * | 3/2015 | Murphy-Chutorian .. G06K 9/46 707/723 |
| 2008/0089615 A1 * | 4/2008 | Shiiyama ............. G06K 9/4642 382/305 |

(Continued)

FOREIGN PATENT DOCUMENTS

WO   2014/007586 A1   1/2014

OTHER PUBLICATIONS

Benavente et al., "Parametric fuzzy sets for automatic color naming," *J. Opt. Soc. Am. A* 25(10):2582-2593, Oct. 2008.
(Continued)

*Primary Examiner* — Bernard Krasnic
(74) *Attorney, Agent, or Firm* — Seed IP Law Group LLP (57) ABSTRACT

Searches performed in a data base using image descriptors of query images are managed via a mobile communication device, such as a smartphone, a tablet, etc., by: extracting at the mobile device grayscale and color descriptors of query images, sending the grayscale descriptors as compressed grayscale descriptors of query images from the mobile device to a server for searching in the data base, receiving at the mobile device results of the search, using color descriptors of query images in disambiguating the results by: i) sending the color descriptors as compressed color descriptors of query images from the mobile device to the server and receiving at the mobile device disambiguated search results from the server, or ii) receiving at the mobile device non-disambiguated search results from the server and disambiguating the search results by means of the color descriptors extracted at the mobile device to produce disambiguated search results.

21 Claims, 5 Drawing Sheets

(56) References Cited

U.S. PATENT DOCUMENTS

| | | | |
|---|---|---|---|
| 2012/0131088 A1 | 5/2012 | Liu et al. | |
| 2014/0101195 A1* | 4/2014 | Li | G06F 17/30277 707/769 |
| 2014/0105505 A1* | 4/2014 | Ioffe | G06K 9/4676 382/197 |

OTHER PUBLICATIONS

Bober et al., "Test Model 6: Compact Descriptors for Visual Search," International Organisation for Standardisation, ISO/IEC JTC1/SC29/WG11/W13564, Apr. 2013, Incheon, KR, 51 pages.

Chandrasekhar et al., "Low Latency Image Retrieval with Progressive Transmission of CHoG Descriptors," *MCMC'10*, Oct. 29, 2010, Firenze, Italy, pp. 41-46.

Fischler et al., "Random Sample Consensus: A Paradigm for Model Fitting with Applications to Image Analysis and Automated Cartography," *Graphics and Image Processing* 24(6):381-395, Jun. 1981.

Girod et al., "Mobile Visual Search: Architectures, Technologies, and the Emerging MPEG Standard," *Industry and Standards*, IEEE Multimedia, Jul.-Sep. 2011, pp. 86-94.

Khan et al., "Discriminative Color Descriptors," *IEEE Conference on Computer Vision and Pattern Recognition (CVPR)*, Portland, OR, Jun. 23-28, 2013, pp. 2866-2873.

Lowe, "Distinctive Image Features from Scale-Invariant Keypoints," *International Journal of Computer Vision* 60(2):91-110, 2004.

Pau et al., "White Paper on Compact Descriptors for Visual Search," International Organization for Standardization, ISO/IEC JTC1/SC29/WG11, Incheon, KR, Apr. 2013, 10 pages.

Van de Weijer et al., "Coloring Local Feature Extraction," *Computer Vision—ECCV* 2006 3952:334-348, 2006.

Van de Weijer et al., "Learning Color Names for Real-World Applications," *IEEE Transactions on Image Processing* 18(7):1512-1523, Jul. 2009.

Wang et al., "Peking University Response to CE2: Frequency Domain Interest Point Detector," International Organisation for Standardisation, ISO/IEC JTC1/SC29/WG11, Apr. 2013, Incheon Korea, 17 pages.

\* cited by examiner

METHOD FOR OBJECT RECOGNITION, CORRESPONDING SYSTEM, APPARATUS AND COMPUTER PROGRAM PRODUCT

BACKGROUND

Technical Field

The present description relates to object recognition.

One or more embodiments may apply to recognizing objects for which color information may be discriminating.

One or more embodiments may apply to recognizing objects in a mobile communication environment.

Description of the Related Art

Object recognition is an interesting branch of computer vision.

For instance, searching content among, say, billions of images may be a complex task; conventional approaches still widely used, such as text-based, low-level or semantic approaches, may prove to be hardly satisfactory when dealing with massive amounts of data interactively.

Attention has been paid to the possibility of processing queries by other means, such as Content Based Image Recognition (CBIR). A basic concept underlying CBIR is analyzing the visual content of images, rather than relying on metadata; the visual content of images may be analyzed by resorting to various algorithms and techniques developed in different fields such as statistics, pattern recognition and computer vision.

Over the years, CBIR has attracted an increasing amount of attention in the area of research and is now expanding towards commercial applications. For instance, adaptation of CBIR techniques to a mobile scenario or environment may lead to Mobile Visual Search (MVS) applications, which may provide an intuitive, seamless, direct way of presenting information enabling Augmented Reality (AR) with a completely new perspective, e.g., by interacting directly with an object. For instance, a user may take a photograph of a certain (rigid) object and receive information about it, with (possibly augmented) audio, video, 3D graphics contents.

The Tesco Homeplus Virtual Subway Store in Korea provides a non-conventional way of buying supermarket goods: images of objects available for purchase are displayed on subway walls and, while waiting for trains, subway users can purchase goods with their mobile phones by using QR code markers.

The possibility would otherwise exist of recognizing these objects by dispensing with barcodes or QR codes, for example by taking advantage of the MPEG CDVS standard.

Various algorithms permit visual feature extraction and compression, e.g., by extracting features from gray-level images, that is by taking into account the luma (grayscale) information. Interest point detector and descriptor techniques may permit to recognize objects with certain characteristics (e.g., rigid, un-deformable objects). Grayscale interest point detectors and descriptors can thus can be used in visual retrieval systems where people interact with objects in an augmented reality scenario. Visual retrieval systems based on interest point detectors and descriptors may permit, e.g., to recognize goods in a supermarket.

A relevant factor in applications such as the "virtual supermarket" hinted at in the foregoing lies in that certain articles as presented in supermarkets or stores may be quite similar and differ only for the combination of colors of the package (e.g., the distribution across the image, the dominant colors and so on). For instance, two CDs may actually be two versions of a same album, an "old" release and a "new" release, possibly remastered and/or including one or more bonus tracks, with the two versions differing only for a different color and/or some small lettering on the box/cover. This may well apply also to many types of man-made objects.

Also, certain visual retrieval system like the CDVS Test Model discussed in "CDVS. Test Model 6: Compact Descriptors for Visual Search, W13564," Incheon, Korea, 2013, may be unable to reliably distinguish so-called challenging objects, that is objects of a very similar class of objects.

While certain interest point detector and descriptor algorithms can extract and codify also color information, their possible application to, e.g., a mobile communication context may be limited by factors such as bandwidth or traffic requirements or the desire of ensuring compatibility with previous implementations.

BRIEF SUMMARY

One or more embodiments may relate to a corresponding system, a corresponding apparatus such as, e.g., a mobile communication device incorporating such a system, as well as to a computer program product loadable in the memory of at least one computer and including software code portions for executing the steps of the method when the product is run on at least one computer. Reference to "at least one computer" is intended to highlight the possibility of the embodiments of present disclosure being implemented in modular and/or distributed form.

The claims are an integral part of the technical disclosure provided herein.

One or more embodiments may provide a robust visual retrieval system particularly suited for mobile applications.

One or more embodiments may address the problem of distinguishing and recognizing a class of objects for which color information is discriminating, by resorting to a synergistic approach which may involve conventional luminance-based interest point detectors and descriptor and a novel class of color descriptors.

One or more embodiments may provide an image content retrieval system, adapted for use in mobile systems, which may use color information together with classic luma (grayscale) information to disambiguate similar objects and strengthen the retrieval process.

One or more embodiments may address the problems generated by the use of the conventional grayscale interest point detectors and descriptors.

One or more embodiment may be used in conjunction with color descriptors to disambiguate among similar objects, thus improving recognition performance.

One or more embodiment may relate to managing—via mobile communication device—searches performed in a data base by means of image descriptors of query images.

In one or more embodiments, both grayscale and color descriptors of query images may be extracted at the mobile device.

In one or more embodiments, the grayscale descriptors of query images may be optionally compressed and sent from the mobile device to a server for descriptor-based searching in a data base.

In one or more embodiments, if the results obtained from the search performed by using the grayscale descriptors require disambiguation (e.g., the results are ambiguous because plural results have been obtained based on a same query image and are thus ambiguous) the color descriptors may be used in disambiguating the search results (e.g., in order to remove the ambiguity of plural results).

In one or more embodiments, disambiguation may involve sending color descriptors as compressed color descriptors of query images from the mobile device to the server and receiving at the mobile device search results disambiguated or distinguished at the server.

In one or more embodiments, disambiguation may involve sending both grayscale (luma) and color descriptors as compressed descriptors of query images from the mobile device to the server and receiving at the mobile device search results disambiguated at the server by using the color descriptors.

In one or more embodiments, disambiguation may involve receiving at the mobile device search results from the server which are non-disambiguated and disambiguating the search results based on the (e.g., non-compressed) color descriptors of query images extracted at the mobile device.

In one or more embodiments, if the results of the search based on grayscale descriptors are non-ambiguous and thus do not need be disambiguated, the possibility exists of omitting the extraction of the color descriptors of the query images at the mobile device or omitting sending these color descriptors as compressed color descriptors of the query images from the mobile device to the server.

In an embodiment, a method of managing via a mobile communication device searches performed in a data base using image descriptors of query images, the method including: extracting at said mobile device both grayscale and color descriptors of query images, sending said grayscale descriptors as compressed grayscale descriptors of query images from said mobile device to a server for searching in said data base, receiving at said mobile device the results of said search in said data base, using said color descriptors of query images in distinguishing the results of said search in said data base by one of: i) sending said color descriptors as compressed color descriptors of query images from said mobile device to said server and receiving at said mobile device distinguished search results from said server, or ii) receiving at said mobile device non-distinguished search results from said server and distinguishing said search results based on the color descriptors of query images extracted at said mobile device to produce distinguished search results. In an embodiment, the method includes: extracting at said mobile device said grayscale descriptors of query images and sending them as compressed grayscale descriptors of query images from said mobile device to said server for searching in said data base, receiving at said mobile device a message indicative that the results of said search in said data base need to be distinguished, upon receiving said message, extracting at said mobile device said color descriptors of query images and sending them as compressed color descriptors from said mobile device to said server for distinguishing the results of said search in said data base, and receiving at said mobile device distinguished search results from said server. In an embodiment, the method includes: extracting at said mobile device said grayscale descriptors of query images and sending them as compressed grayscale descriptors of query images from said mobile device to said server for searching in said data base, extracting at said mobile device said color descriptors of query images, and sending them as compressed color descriptors of query images from said mobile device to said server, whereby said compressed color descriptors of query images become available at said server for distinguishing the results of said search in said data base, and receiving at said mobile device distinguished search results from said server.

In an embodiment, the method includes: merging at said mobile device said grayscale and color descriptors of query images to produce merged grayscale and color descriptors of query images, sending said grayscale descriptors as compressed merged grayscale and color descriptors of query images from said mobile device to said server for searching in said data base, whereby said compressed color descriptors of query images become available at said server for distinguishing the results of said search in said data base; and receiving at said mobile device distinguished search results from said server. In an embodiment, at least one of: extracting at said mobile device said color descriptors of query images, sending said color descriptors as compressed color descriptors of query images from said mobile device to said server, is omissible in the absence of the need of distinguishing the results of said search in said data base.

In an embodiment, a mobile communication device manages searches performed in a data base based on image descriptors of query images according to an embodiment of a method disclosed herein. In an embodiment, the device includes: an extractor configured for extracting at said mobile device both grayscale and color descriptors of query images and sending said grayscale descriptors as compressed grayscale descriptors of query images from said mobile device to a server for searching in said data base, a receiver for receiving at said mobile device the results of said search in said data base, the device being configured for using said color descriptors of query images in distinguishing the results of said search in said data base by one of: i) said extractor sending said color descriptors as compressed color descriptors of query images from said mobile device to said server with said receiver receiving at said mobile device distinguished search results from said server, or ii) said receiver receiving at said mobile device non-distinguished search results from said server, with distinguishing provided at said mobile device of said search results based on the color descriptors of query images extracted at said mobile device.

In an embodiment, a mobile communication apparatus includes a device to manage searches in a data base for searches in a data base based on image descriptors of query images, and an image capture device for generating digital images and providing said digital images as query images to said device. In an embodiment, the mobile communication apparatus includes a receiver with a display to present said distinguished search results.

In an embodiment, a computer program product, loadable in the memory of at least one computer, includes software code portions for implementing an embodiment of a method disclosed herein when run on said at least one computer.

In an embodiment, a method comprises: extracting, using a mobile communication device, grayscale descriptors of query images; sending compressed grayscale descriptors based on the extracted greyscale descriptors from said mobile communication device to a server; and when search results of a search of a data base by the server are ambiguous, distinguishing the ambiguous search results, the distinguishing ambiguous search results including at least one of: extracting color descriptors from query images using the mobile communication device, sending compressed color descriptors from the mobile communication device to the server and receiving distinguished search results from the server; and receiving the ambiguous search results from the server, extracting color descriptors from query images using the mobile communication device, and distinguishing, using the mobile communication device, the ambiguous search results based on the extracted color descriptors. In an embodiment, the ambiguous search results are based on the compressed grayscale descriptors sent from the mobile station to the server and the method comprises: receiving at said mobile communication device a message indicating the results of said search in said data base are ambiguous; responding to the message by extracting at said mobile device said color descriptors of query images and sending compressed color descriptors based on the extracted color descriptors from said mobile device to said server; and receiving the distinguished search results from the server. In an embodiment, the method comprises: after sending the compressed greyscale descriptors to the server, sending compressed color descriptors based on the extracted color descriptors from the mobile communication device to the server; and receiving distinguished search results from the server, the distinguished search results being based on the color descriptors. In an embodiment, the method comprises: sending compressed, merged grayscale and color descriptors from the mobile communication device to the server; and receiving at said mobile communication device search results distinguished by the server based on the compressed, merged grayscale and color descriptors. In an embodiment, when the search results of a search of the data base based on compressed grayscale descriptors of a query image are not ambiguous, color descriptors of the query image are not extracted from the query image. In an embodiment, when the search results of a search of the data base based on compressed grayscale descriptors of a query image are not ambiguous, compressed color descriptors of the query image are not sent from the mobile communication device to the server.

In an embodiment, a device comprises: one or more memories; and circuitry coupled to the one or more memories, which, in operation, extracts grayscale descriptors of a query image; outputs compressed grayscale descriptors based on the extracted greyscale descriptors; and when search results of a search of a data base are ambiguous, distinguishes the ambiguous search results, the distinguishing ambiguous search results including extracting color descriptors from the query image and at least one of: outputting compressed color descriptors based on the extracted color descriptors and receiving distinguished search results; and receiving the ambiguous search results and distinguishing the ambiguous search results based on the extracted color descriptors. In an embodiment, the circuitry, in operation, responds to a message indicating the results of a search in the data base are ambiguous by extracting the color descriptors and outputting compressed color descriptors based on the extracted color descriptors to a server; and receives distinguished search results from the server. In an embodiment, the circuitry, in operation, after outputting the compressed greyscale descriptors, sends compressed color descriptors based on the extracted color descriptors; and receives distinguished search results from a server, the distinguished search results being based on the outputted color descriptors. In an embodiment, the circuitry, in operation, outputs compressed, merged grayscale and color descriptors; and receives search results distinguished based on the compressed, merged grayscale and color descriptors. In an embodiment, when the search results of a search of the data base based on compressed grayscale descriptors of a query image are not ambiguous, the circuitry, in operation, does not extract color descriptors of the query image. In an embodiment, when the search results of a search of the data base based on compressed grayscale descriptors of a query image are not ambiguous, the circuitry, in operation, does not output compressed color descriptors of the query image.

In an embodiment, a non-transitory computer-readable medium's contents cause a communication apparatus to perform a method, the method comprising: extracting grayscale descriptors of a query image; outputting compressed grayscale descriptors of the query image based on the extracted greyscale descriptors; and when search results of a search of a data base are ambiguous, distinguishing the ambiguous search results, the distinguishing ambiguous search results including at least one of: outputting compressed color descriptors and receiving distinguished search results based on the outputted compressed color descriptors; and receiving the ambiguous search results and distinguishing the received ambiguous search results based on color descriptors extracted from the query image. In an embodiment, the ambiguous search results are based on the outputted compressed grayscale descriptors and the method comprises: responding to a received message indicating the results of said search in said data base are ambiguous by extracting color descriptors of the query image and outputting compressed color descriptors based on the extracted color descriptors; and receiving distinguished search results. In an embodiment, the method comprises: after outputting the compressed greyscale descriptors to the server, outputting compressed color descriptors based on extracted color descriptors of the query image; and receiving distinguished search results based on the compressed color descriptors. In an embodiment, the method comprises: outputting compressed, merged grayscale and color descriptors; and receiving search results distinguished by the server based on the compressed, merged grayscale and color descriptors. In an embodiment, when the search results of a search of the data base based on compressed grayscale descriptors of a query image are not ambiguous, color descriptors of the query image are not extracted from the query image. In an embodiment, when the search results of a search of the data base based on compressed grayscale descriptors of a query image are not ambiguous, compressed color descriptors of the query image are not output.

In an embodiment, a system comprises: one or more memories; and circuitry which, in operation, extracts grayscale descriptors of query images; extracts color descriptors of query images; outputs compressed grayscale descriptors of query images; and when search results based on compressed grayscale descriptors of a query image are ambiguous, provides content distinguishing the ambiguous search results based on at least one of: received distinguished search results which are based on compressed color descriptors of the query image output by the circuitry; and received ambiguous search results and color descriptors extracted from the query image by the circuitry. In an embodiment, the system comprises: an image capture device coupled to the circuitry. In an embodiment, the system comprises: a display, which, in operation, displays the content distinguishing the ambiguous search results.

BRIEF DESCRIPTION OF THE SEVERAL VIEWS OF THE DRAWINGS

One or more embodiments will now be described, purely by way of non-limiting example, with reference to the annexed figures, wherein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for the convenience of the reader and hence do not define the scope of protection or the scope of the embodiments.

By way of introduction, the CDVS Test Model as described in D. Pau, G. Cordara, M. Bober, S. Paschalakis, K. Iwamoto, G. Francini, V. Chandrasekhar, and G. Takacs, "White Paper on Compact Descriptors for Visual Search," 2013, is exemplary of a visual retrieval system adapted for use in contexts involving mobile devices. The document relates to the whole process of Content Based Image Recognition (CBIR), from feature extraction and compression to retrieval on the server side. In certain implementations, it may use features extracted from grayscale images in order to recognize a particular class of objects.

Datasets used for testing the related CDVS Test Model may cover other object classes, e.g., object classes for objects such as CDs, DVDs, books, video frames, museum paintings, business cards, buildings and landscapes. In possible extensions to the recognition of goods in supermarkets, the possibility may exist of encountering objects which, even though different, may exhibit a high degree of similarity.

For instance, two objects may differ only in the color of their packages and/or by a small lettering at the bottom. A case in point may be two types of wine, red and white, which are sold in packages which differ only in their dominant colors but are otherwise identical.

A feature extractor algorithm based only on luma (grayscale) information may be unable to distinguish (disambiguate) these two objects. This was confirmed by tests on a dataset containing photographs of supermarket products and involving pairwise matching experiments where the matching and non-matching pairs were chosen randomly, including photographs of challenging objects, namely products that differ from each other only by the color of the product itself or small details in the package. For instance, certain matching experiments yielded results similar in terms of success rates values, while demonstrating relevant differences in terms of false alarm rates (e.g., 37.83% v. 65.94%).

Interestingly, the higher false alarm rates were found to occur when using higher bitrate descriptors. These results are indicative of an inability to discriminate challenging objects as may expectedly occur, e.g., in supermarket or store applications.

One or more embodiments may provide an image and multimedia contents retrieval system which, e.g., may give a mobile device user the possibility of making visual queries to a remote service: the user will be able to get information about particular objects by taking images (still pictures or video frames) of these objects.

In one or more embodiments, a system may involve a mobile device UE and a server S, communicating, e.g., over a mobile communication network.

In one or more embodiments, the mobile device UE may be any of a user equipment, e.g., a cell phone or a tablet adapted to be used as an input device, e.g., by taking an image or video of an object or scene.

In one or more embodiments, such mobile device may be incorporated to apparatus including a video capture device, e.g., a (video) camera adapted to generate digital color images (still images or video frames) and provide them as input images I for processing as exemplified in the following. Such video capture devices are conventional in the art, which makes it unnecessary to provide a more detailed description herein.

Procedures adapted to be implemented in one or more embodiments may involve the following steps:

in the mobile device UE, visual features of an object are extracted from images I (still or video) produced at the device; these visual features are coded and sent to a server S, e.g., over a mobile communication network;

a retrieval system available at the server S compares the visual features sent by the mobile device UE with those contained in a data base; corresponding features may be employed to recognize the object and send corresponding information from the server S to the mobile device UE;

the mobile device UE processes and presents (e.g., multimedia) information about the object.

A practical application of such a procedure may be exemplified as follows.

A user has just finished dinner. While clearing the kitchen table, he or she realizes that an oil bottle put back in the cupboard is almost empty. The user takes his or her cell phone and takes a photograph of the bottle. An application in the phone may recognize the oil bottle and redirect the user to an online supermarket store for possibly purchasing a new bottle of the same oil. The user decides to buy it and will have it delivered in a few hours straight home.

In one or more embodiments such a procedure may include disambiguation processing which makes it possible to discriminate—on the basis of color features—between similar results possibly obtained by the database retrieval system.

Various types of exemplary architectures suitable to perform such a procedure will be described in the following. These architectures are exemplary of different ways color and luma (grayscale) features may exploited server-side and/or client-side, e.g., in the mobile device UE.

In describing these exemplary architectures, the following abbreviated terminology will be adopted:

a Luma Feature: any feature adapted to be extracted from a grayscale image;

Luma Descriptor: any descriptor representative of a class of features, called Local Descriptors, extracted from a grayscale image;

Color Features or Color Descriptor: any Features and Local Descriptors extracted from a digital color image.

Figure 1:
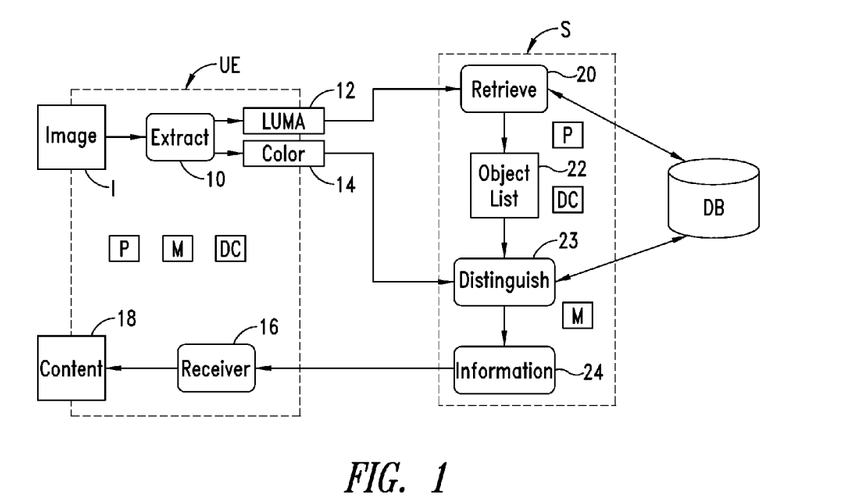
FIG. 1 is a functional block diagram exemplary of possible embodiments.

FIG. 1 is a functional block diagram of a first exemplary system architecture according to one or more embodiments.

An extraction/compression module or circuit 10 may perform feature extraction from input images I (still/video) at the mobile device UE.

Feature extraction may be performed in any known manner (which makes it unnecessary to provided a more detailed description herein) and lead to extracting and compressing separately the luma and color features as represented by compressed (compact) luma (grayscale) descriptors 12 and 14, respectively.

Then, the compressed features may be sent to the (remote) server S, where luma features may be used as query by the server, while color features may be stored for possible use later.

In one or more embodiments, a retrieval module or circuit 20 in the server may use the received luma descriptors 12 as query input for a new visual search in a database DB and return a list 22 of objects with the highest similarities with respect to the query features.

It will be appreciated that, while being available at the server S, the data base DB may in fact be arranged at a different location from the server S (possibly as a distributed data base).

The retrieval module or circuit 20 may return only one result, so that there is no need for disambiguation, so that information about the returned object (e.g., a description 24) may be sent to a receiver module or circuit 16 of the client (mobile device UE) for presentation therein as, e.g., multimedia contents 18.

The retrieval module or circuit 20 may otherwise return plural results, which may be fed to a disambiguation/distinction module or circuit 23 at the server S, where (new) color descriptors are derived from the retrieved images to be compared with compact descriptors 14 computed on the query image as obtained from the mobile device UE.

The disambiguation module or circuit 23 may thus identify, out of the various results returned from the retrieval module or circuit 20, an object having a highest similarity to the query input and again send to the receiver module or circuit 16 in the mobile device UE (disambiguated) information 24 for presentation of related contents 18 in the mobile device.

Figure 2:
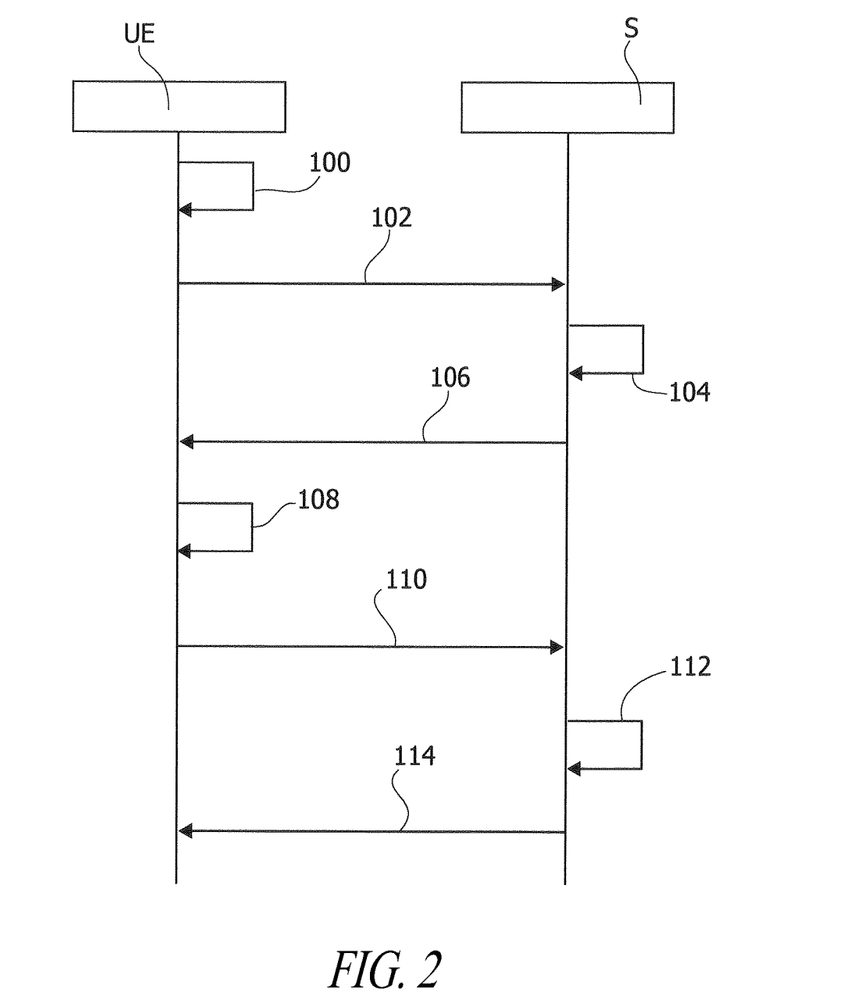
FIGS. 2 and 3 are chronograms exemplary of possible information flows in embodiments.

The procedure just described in the case where disambiguation is performed at the server is further illustrated in the chronogram of FIG. 2, which is exemplary of possible communication flows between the client (mobile device) UE and the server S.

Specifically, the following steps are exemplified in FIG. 2:
100: computation of luma (grayscale) descriptors at the mobile device UE;
102: luma descriptors are sent from the mobile device UE to the server S;
104: retrieval at the server S;
106: server S sends to the mobile device UE a message requesting color descriptors;
108: computation of color descriptors in the mobile device UE;
110: color descriptors are sent from the mobile device UE to the server S;
112: disambiguation (server-side);
114: result sent to the mobile device UE.

The UE of FIG. 1 includes circuitry, which as illustrated comprises a processor P, a memory M and discrete circuitry DC. The circuitry may be configured alone or in various combinations to implement the functionality of the UE. For example, the processor P may execute instructions store in the memory, the memory may store a lookup table, the discrete circuitry may include combination logic, adders, multiplexers, state machines may be employed, etc., and various combinations thereof. As illustrated, the server of FIG. 1 includes a processor P, a memory M and discrete circuitry DC, which may be configured alone or in various combinations to implement the functionality of the server. For example, the processor P may execute instructions store in the memory, the memory may store a lookup table, the discrete circuitry may include combination logic, adders, multiplexers, state machines may be employed, etc., and various combinations thereof.

In one or more embodiments, the sequence of FIG. 2 lends itself to be executed as a strictly serial pipeline where the time for executing the entire pipeline may be affected by delays.

Figure 3:
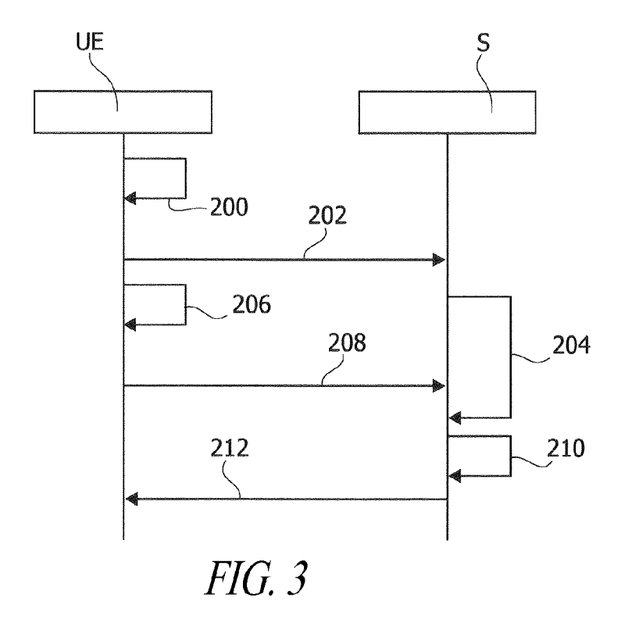

The chronogram of FIG. 3 is exemplary of possible communication flows between the client (mobile device) UE and the server S according to a "parallel" model wherein, while the server S is executing the retrieval task, the client UE may compute the color descriptors and send them to the server.

Specifically, the following steps are exemplified in FIG. 3:
200: computation of luma (grayscale) descriptors at the mobile device UE;
202: luma descriptors are sent from the mobile device UE to the server S;
204: retrieval is started at the server S;
206: computation of color descriptors in the mobile device UE;
208: color descriptors are sent from the mobile device UE to the server S;
210: disambiguation (server-side);
212: result sent to the mobile device UE.

The time to compute the color descriptors (step 206) and transmit them (step 208) may be shorter than the time needed for retrieval (step 204). By making these tasks parallel, the time needed for color disambiguation may be just the time taken by the matching process since the color descriptors are already available when possibly required for disambiguation. That is, the time for matching is only a function of the luma descriptors in case no disambiguation is performed, otherwise the total time for matching is a function of both the luma and the color descriptors.

In a procedure/architecture as just exemplified availability of color descriptors for disambiguation may however be affected by delays in communication over the network.

In one or more embodiments, color descriptors may be pre-computed and stored in the database DB rather than computed each time as possibly needed.

Figure 4:
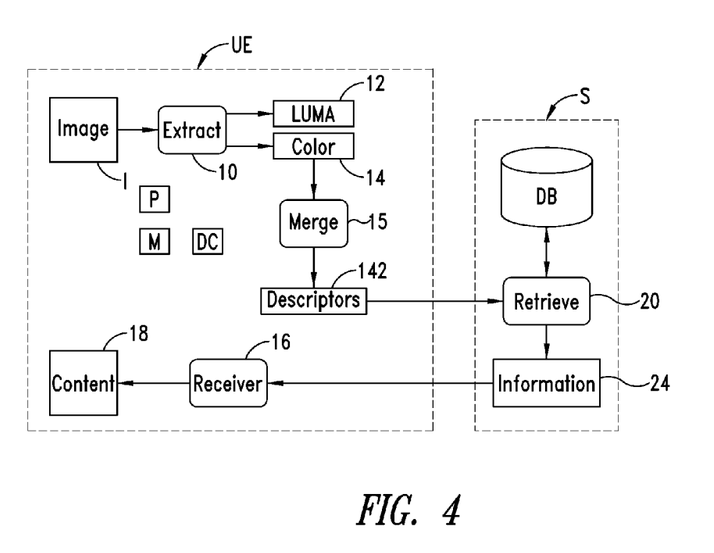
FIGS. 4 and 5 are functional block diagram exemplary of embodiments.

FIG. 4 is a functional block diagram of a second exemplary system architecture according to one or more embodiments.

In FIG. 4, modules/functions/circuits identical or equivalent to modules/functions/circuits already described in connection with FIG. 1 are indicated by the same references already appearing in FIG. 1; a corresponding description will not be repeated.

As is the case for FIG. 1, in the exemplary architecture of FIG. 4, the images I may be input to an extraction/compression module/circuit 10 to produce compressed luma and color descriptors 12, 14.

Differently from FIG. 1, where the descriptors 12, 14 may be sent separately to the server S, in the exemplary architecture of FIG. 4, the descriptors 12, 14 may be merged together in a fusion module/circuit 15 (e.g., a normalizer, a multiplexer, a frame mapper, etc.) in the mobile device UE and the resulting fusion descriptors 142 may be sent to the server S for possible use in the retrieval module/circuit 20, so that retrieval in the data base DB (including possible disambiguation of results) may be based on these fusion descriptors 142.

Again, the retrieval module/circuit 20 in the server S may return the result with highest similarity to the query input and again send to the receiver module/circuit 16 in the mobile device UE information 24 (already disambiguated) for presentation of related (e.g., multimedia) contents 18 in the mobile device UE.

Figure 5:
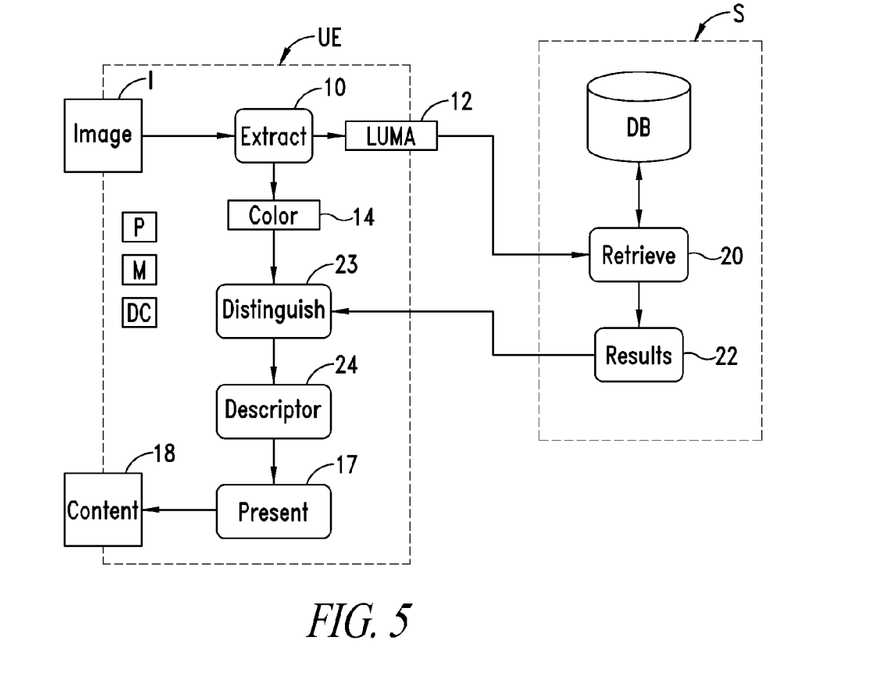

FIG. 5 is a functional block diagram of a third exemplary system architecture according to one or more embodiments.

In FIG. 5, modules/circuits identical or equivalent to modules/circuits already described in connection with FIGS. 1 and 4 are indicated by the same references already appearing in FIGS. 1 and 4; a corresponding description will not be repeated.

As in the case of FIGS. 1 and 4, in the exemplary architecture of FIG. 5, the images I may be input to an extraction/compression module/circuit 10 to produce luma (grayscale) and color descriptors 12, 14.

In the exemplary architecture of FIG. 5, compressed luma descriptors 12 are sent to the server S for use by the retrieval module/circuit 20 as query input for a visual search in the database DB whose outcome is indicated by the block 22.

As in the case FIG. 1, in the exemplary architecture of FIG. 5, the retrieval module/circuit 20 may return only one result, so that there is no need for disambiguation. That result may thus be sent to the mobile device UE and the related information about the returned object (e.g., a description 24) may be fed to a presentation module/circuit 17 in the mobile device UE for presentation as, e.g., multimedia contents 18.

Again as in the case FIG. 1, in the exemplary architecture of FIG. 5, the retrieval module/circuit 20 may otherwise return plural results to be disambiguated. In the exemplary architecture of FIG. 5, such plural results 22 may be sent from the server S to the mobile device UE to be processed there in a disambiguation/distinguish module/circuit 23 which operates on the basis of the color descriptors 14 produced by the module/circuit 10.

Out of the various results received from the retrieval module/circuit 20 in the server S, the disambiguation module/circuit 23 in the mobile device UE may thus identify an object having a highest similarity to the query input and send it to the presentation module/circuit 17 for presentation of related contents 18 in the mobile device.

In the exemplary architecture of FIG. 5, the color descriptors 14 produced by the module/circuit 10 are not intended to be sent to the server S.

In one or more embodiments, these color descriptors may not be compressed (compact) descriptors.

In one or more embodiments, even though these color descriptors may not be sent to the server, they may be compressed so that matching during the search may be based on a Hamming distance, which is less complex than a Euclidean distance.

The exemplary architecture of FIG. 5—where results (images) are sent back to the client (mobile device UE) for possible disambiguation—may be useful in high-speed networks.

The following is a description of exemplary embodiments of various modules/functions/circuits as discussed in the foregoing. Reference being made herein to modules/functions/circuits highlights the possibility that any of these may be implemented in HW and/or SW form, and various combinations thereof. Similarly, each of the modules/functions/circuits exemplified herein may be implemented as an individual module/function/circuit or as a plurality of cooperating sub-modules/sub-functions/sub-circuits; it may also be integrated as a component of a more complex module/function/circuit. Specific use requirements/constraints will direct implementation options correspondingly.

Extraction/Compression Module/Function/Circuit 10

In one or more embodiments, such module/function/circuit may process input images (still/video) I to derive therefrom output (compressed) image descriptors (designated 12, 14 in the figures).

In one or more embodiments, the module/function/circuit 10 may receive as an input a colored image (typically an RGB or YUV image or any other color space) to perform descriptor extraction and compression, e.g., by means of an extraction pipeline including:

an input stage, where a detector sub-module may identify the most stable features (keypoints) in an image I,
a descriptor stage providing a description of each keypoint,
a compression stage wherein descriptions are compressed.

In one or more embodiments, the output of such an extraction module/function/circuit may be a list of keypoints with their associated compressed descriptions.

Exemplary extraction pipelines adapted for use in one or more embodiment are those based on the SIFT algorithm (see D. Lowe, "Distinctive Image Features from Scale-Invariant Keypoints," *International Journal of Computer Vision*, vol. 60, no. 2, pp. 91-110, 2004), or FBLog (see F. Wang, L.-Y. Duan, J. Chen, Q. Huang, T. Huang, C. A. Kot, and W. Gao, "m28891 Peking University Response to CE2: Frequency Domain Interest Point Detector," Incheon, Korea) as used, e.g., in the Test Model 6 (see "CDVS. Test Model 6: Compact Descriptors for Visual Search, W13564," Incheon, Korea, 2013). The related procedures rely on "grayscale detector/descriptor algorithms", that is they build the descriptors by using luma information only.

One or more embodiments herein use also color descriptors and may thus rely on "color descriptor algorithms": as a non-limiting example of such a procedure, reference may be made to the "color descriptor algorithm" described in R. Khan, J. van de Weijer, F. Khan, D. Muselet, C. Ducottet, and C. Barat, "Discriminative Color Descriptors," in *CVPR*, 2013, which uses a RGB image and a list of keypoints as an input. For all the keypoints, a list of properties may be provided (e.g., spatial location, scale and orientation). The colors of pixels in an image patch around the keypoint center are sampled using a simple lookup table.

The following is a summary of the processing steps for a certain keypoint:

an image patch is selected to be processed; the patch size and orientation may be shaped according to the properties associated to the input keypoint;
Gaussian weights are applied by overlying a Gaussian 2D window to the selected patch to determine the contribution of a single pixel to the final descriptor;
the pixels, as weighted by the Gaussian weight function are sampled using a look up table and added to the color histogram. A color histogram may include, e.g., 11, 25 or 50 bins (examples are detailed, e.g., in Khan).

As regards the construction of the look up table, the authors in Khan report on in-depth study of the photometric invariance properties and the trade-offs related to the loss of discriminative power and propose a clustering technique related to the mutual information measure.

Different methods (oftentimes referred to as Color Names descriptors) are otherwise known in the art for the construction of color descriptors lookup tables. For instance, the authors J. Van De Weijer and C. Schmid in "Coloring local feature extraction," *Computer Vision—ECCV* 2006, pp. 334-348, 2006 and the authors J. Van De Weijer, C. Schmid, J. Verbeek, and D. Larlus in "Learning color names for real-world applications," *Image Processing, IEEE Transactions on*, vol. 18, no. 7, pp. 1512-1523, 2009 describe various approaches for training and using Color Names descriptors. Another method is described in R. Benavente, M. Vanrell, and R. Baldrich, "Parametric fuzzy sets for automatic color naming," *Journal of the Optical Society of America A*, vol. 25, no. 10, pp. 2582-2593, 2008, where construction of the lookup table is based on fuzzy sets. Other color description algorithms are known and eligible for use in one or more embodiments.

Figure 6:
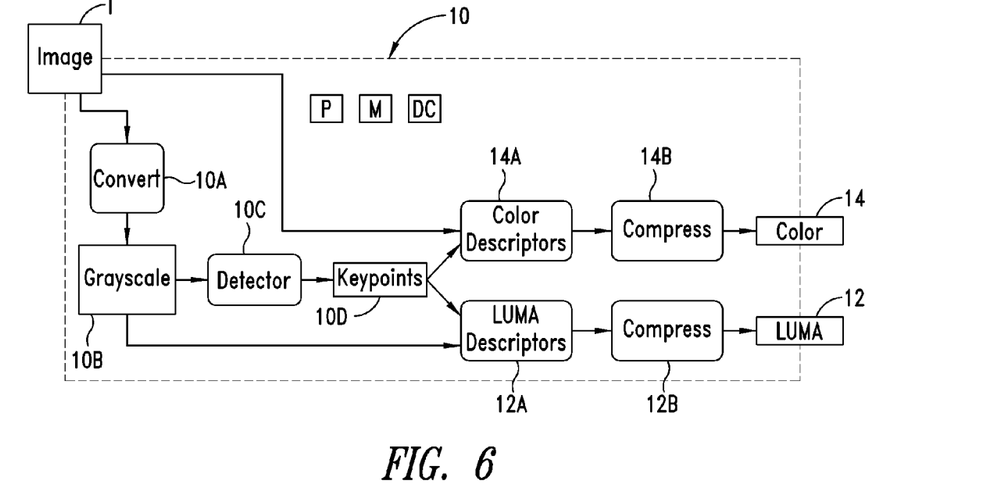
FIG. 6 is a block diagram exemplary of descriptor extraction and compression in embodiments.

In one or more embodiments as exemplified in the functional block diagram of FIG. 6, an input (color) image I may be converted at 10A to a grayscale image 10B containing only the luma information. The grayscale image 10B may then be input to a keypoint detector module/circuit 10C to produce keypoints 10D for use by a luma descriptor module/circuit 12A.

In one or more embodiments, a keypoint detector module/circuit may receive as an input the color image I directly, which makes it possible to use color information for keypoint detection.

Keypoints 10D may be processed (as a function of color information and grayscale information derived, e.g., from the input image I and the grayscale image 10B) by respective (color and luma) descriptor modules/circuits 12A, 14A to produce color and luma descriptions 12A, 14A. These may compressed (e.g., in different ways for each of the two) by respective compression modules/circuits 12B, 14B to produce the output compressed (compact) descriptors 12 and 14.

The compression technique used in the Test Model 6 (see "CDVS. Test Model 6: Compact Descriptors for Visual Search, W13564," Incheon, Korea, 2013) is exemplary of a technique for compressing SIFT descriptors.

The following is a brief description of an exemplary compression pipeline:
- in an input stage, the bins of the descriptor histogram are decorrelated using a set of simple operations (e.g., sums and subtractions);
- since different compression bitrates may be available, the less relevant decorrelated histogram bins are discarded, the number of bins discarded depending, e.g., on the amount of compression required;
- the histogram values may then be ternarized using fixed thresholds learned from a large training dataset.

In one or more embodiments, a compression technique adopted for color descriptors may be very simple, e.g., each histogram bin may be binarized according to a fixed or variable threshold.

In one or more embodiments, a fixed threshold may be determined, e.g., as an average of the values of a training set of keypoint histograms including a sizeable quantity of such histograms.

In one or more embodiments, a variable threshold may be determined, e.g., as the average of a single descriptor histogram, namely, for certain color descriptor histogram associated to a single image keypoint, the histogram bin average is computed and that average is used as threshold for the binarization.

Fusion Module/Circuit 15

Figure 7:
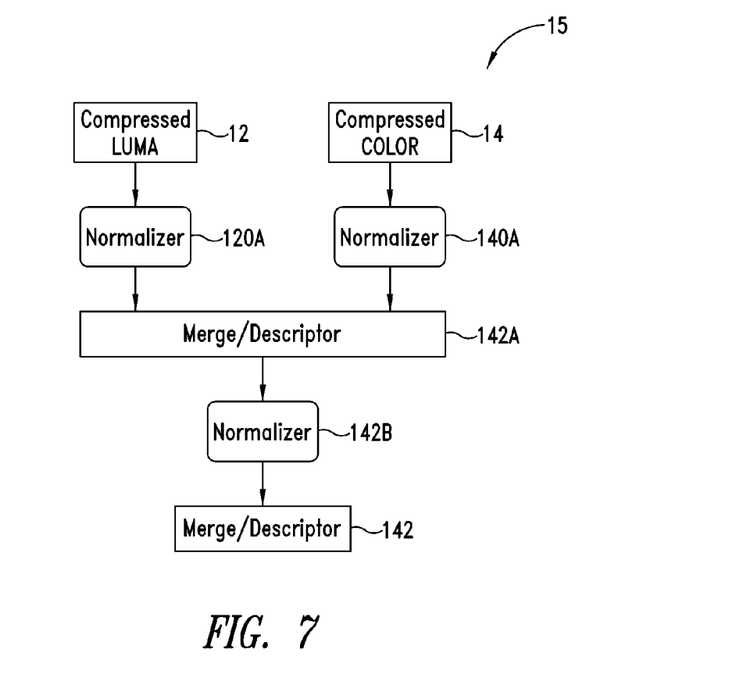
FIG. 7 is a block diagram exemplary of descriptor merging in embodiments.

In one or more embodiments as exemplified in FIG. 7, a fusion module/circuit (block 15 in FIG. 4) may receive as an input the compressed descriptors 12 and 14 to merge them into output merged (fusion) descriptors 142.

One or more embodiments may rely on the fact that a single descriptor may be seen as an n-dimensional vector for which, e.g., a Euclidean norm can be computed.

The components of each such vector be divided by the norm of their respective vectors in normalization modules/circuits 120A, 140A, to produce a merged descriptor 142A. This may be in turn normalized to produce an output merged descriptor 142.

It will be noted that, in one or more embodiments, fusion as exemplified by the block 15 in FIG. 4 may be avoided, e.g., depending on the type of compression and the type of disambiguation adopted.

For instance, such fusion may not be performed in embodiments as exemplified in FIGS. 1 and 5.

Also, such fusion may be avoided if Inlier-based disambiguation is adopted. Similarly, in embodiments using the compression technique exemplified in "CDVS. Test Model 6: Compact Descriptors for Visual Search, W13564," Incheon, Korea, 2013, for the Test Model 6 or certain color descriptor compression techniques as discussed previously, normalization steps as exemplified in FIG. 7 may be dispensed with, so that the fusion module/circuit 15 may only concatenate the descriptors input thereto.

Retrieval Module/Circuit 20

In one or more embodiments, a retrieval module/circuit 20 may be included in the architecture of the server S. In one or more embodiments, the layout of such a retrieval module/circuit 20 may differ depending on the overall system architecture, e.g., as exemplified in FIGS. 1, 4 and 5.

For instance, in one or more embodiments as exemplified in FIG. 1, the retrieval module/circuit 20 may operate on the luma (grayscale) descriptors 12 sent from the mobile device UE and perform a search in the entire descriptor data base DB to find the most relevant ones. These descriptors may correspond to stored images of objects having an appearance similar to the queried object.

As already indicated, the search may return a single result, which may be assumed to correspond to a "right" object to be retrieved, so that no need arises of disambiguating results based on colors. The search may also return plural results, e.g., a list of similar objects, which may be distinguished (disambiguated) using color descriptors.

In one or more embodiments, retrieval may be accomplished in various way depending, e.g., on different application requirements/constraints.

For instance, the retrieval module/circuit 20 may operate on input compressed descriptors and perform the retrieval task either by using directly the compressed descriptors, of using uncompressed (e.g., de-compressed) descriptors.

Various examples of related feature compression and matching are provided in "CDVS. Test Model 6: Compact Descriptors for Visual Search, W13564," Incheon, Korea, 2013, and D. Pau, G. Cordara, M. Bober, S. Paschalakis, K. Iwamoto, G. Francini, V. Chandrasekhar, and G. Takacs, "White Paper on Compact Descriptors for Visual Search," 2013.

In one or more embodiments as exemplified in FIG. 4, the retrieval module/circuit 20 may operate on the merged luma and color descriptors 142 as an input.

In one or more embodiments, the retrieval module/circuit 20 may operate on luma and color descriptors provided separately and include a fusion module/circuit to merge them.

In either case, the retrieval module/circuit 20 may accomplish the retrieval task by matching the merged descriptors with those in the database.

In one or more embodiments, retrieval may be accomplished in various ways (known per se) depending on the architecture design. For example, the retrieval module/circuit 20 may receive compressed descriptors as an input and accomplish the retrieval task using directly those compressed descriptors. The retrieval module/circuit 20 may also accomplish the retrieval task by using uncompressed (e.g., de-compressed) descriptors.

In one or more embodiments, the output from a retrieval module/circuit 20 using fusion or merged descriptors may be an (already disambiguated) description of an identified object, e.g., an identification code or a set of information related to the object, a separate disambiguation being thus unnecessary.

In one or more embodiments as exemplified in FIG. 5, the retrieval module/circuit 20 may operate on the luma (grayscale) descriptors 12 received from the mobile device UE and perform a search on the entire descriptor data base DB.

Again, the search may return a single result, which may be assumed to correspond to a right object to be retrieved, so that no need arises of disambiguating results based on colors. The search may also return plural results, e.g., a list of similar objects, which may be distinguished (disambiguated)—by the circuit 23 at the mobile device UE—by using the color descriptors 14.

Here again, in one or more embodiments, the retrieval task in the module/circuit 20 may be accomplished in various ways depending on the application requirements/constraints.

For example, the retrieval module/circuit 20 may receive compressed descriptors as an input and accomplish the retrieval task using directly those compressed descriptors. The module/circuit 20 may also accomplish the retrieval task by using uncompressed (e.g., de-compressed) descriptors. For every returned object, a reference image may be associated to it and sent to the mobile device UE to be disambiguated in the (client-side) module/circuit 23 by using the (optionally uncompressed) color descriptors extracted from the query images.

Data Base DB

In one or more embodiments the reference image descriptors to be searched may be stored in a database which is made available to the server S.

While the data base DB per se may not be part of the embodiments, the criteria adopted for building the descriptors and/or for storing them in the data base DB may take into account, e.g., the criteria of operation of the extraction module/circuit 10, e.g., the pipeline discussed previously in connection with the extraction module/circuit 10.

The descriptors stored in the data base DB may be in a plain format or compressed with various compression techniques (examples are provided, e.g., in reference "CDVS. Test Model 6: Compact Descriptors for Visual Search, W13564," Incheon, Korea, 2013).

In one or more embodiments, the layout of the data base DB may differ depending on the overall system architecture, e.g., as exemplified in FIGS. 1, 4 and 5.

For instance, in the case of embodiments as per the system architecture exemplified in FIG. 1, luma (grayscale) and color descriptors may be stored in the data base DB either separately or together; in this latter case they may be stored in a way that facilitates separation of the two. For instance if the DBMS (DataBase Management System) permits the extraction of an arbitrary number of bytes for each descriptor, the luma and color descriptors may be stored concatenated. In a first retrieval step only the luma descriptor part may be recalled and in a second retrieval step both parts or only the color descriptors may be recalled.

In the case of embodiments as per the system architecture exemplified in FIG. 4, the luma and color descriptors may be stored together in the data base DB because they may be easily and rapidly compared with those sent by the mobile device UE. In the case of embodiments as per the system architecture exemplified in FIG. 5, only luma descriptors may be stored since color-based disambiguation processing takes place in the mobile device UE.

Disambiguation Module/Circuit 23

In one or more embodiments, the disambiguation module/circuit 23 may operate on an input list of images as provided by the retrieval module/circuit 20, e.g., reference images of similar objects that the retrieval module/circuit is unable to distinguish: for these, color-based disambiguation may be performed.

In one or more embodiments, a second input may be a list of query image features (e.g., keypoints, color descriptors and luma descriptors) as available.

In one or more embodiments, the disambiguation module/circuit 23 may attempt to distinguish the reference images by comparing color descriptors and luma descriptors.

In one or more embodiments, the disambiguation module/circuit 23 may attempt to distinguish the reference images by comparing color descriptors only.

In one or more embodiments, this task may be accomplished in various ways.

Exemplary of disambiguation procedures adapted for use in one or more embodiments are:

inlier-based comparison merged-descriptor comparison

In one or more embodiments, inlier-based comparison may be performed on inliers represented by couples (pairs) of points which passed a geometric consistency check (such an approach is exemplified, e.g., in reference [1] "CDVS. Test Model 6: Compact Descriptors for Visual Search, W13564," Incheon, Korea, 2013).

Figure 8:
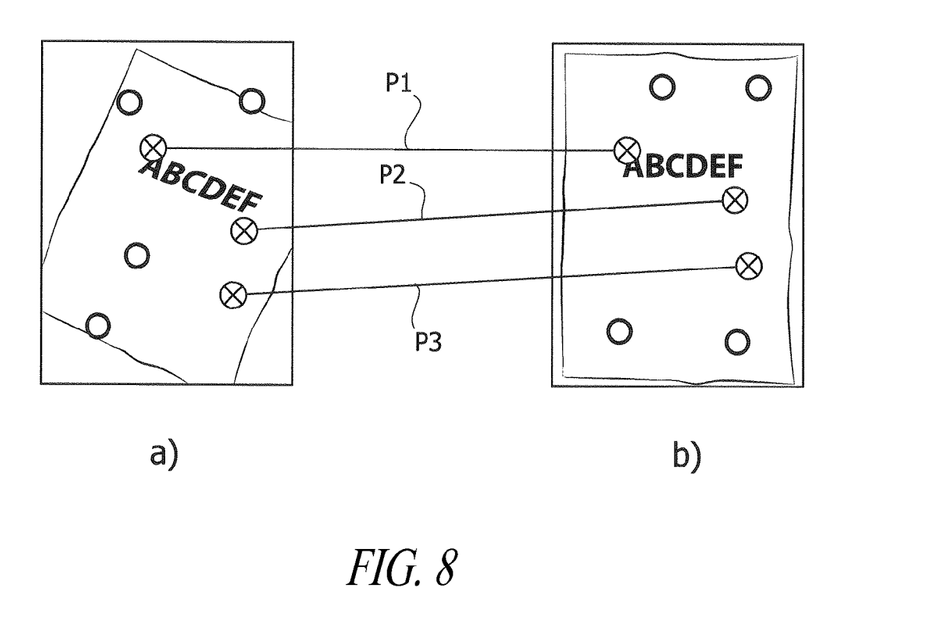
FIG. 8 an exemplary representation of possible image processing in embodiments.

FIG. 8 herein includes two portions (designated a) and b), respectively) which are exemplary of two images to be compared. Keypoints are assumed to be extracted with their descriptors compared with a geometric consistency check performed (e.g., using the Random Sample Consensus algorithm exemplified in reference M. A. Fischler and R. C. Bolles, "Random sample consensus: a paradigm for model fitting with applications to image analysis and automated cartography," *Communications of the ACM*, vol. 24, no. 6, pp. 381-395, 1981).

The points marked in both portions of FIG. 8 with a crossed circle (X) and connected in pairs by the lines P1, P2 and P3 are examples of inliers adapted to be identified in a retrieval module/circuit 20 by using a standard CDVS pipeline as exemplified in reference [1] "CDVS. Test Model 6: Compact Descriptors for Visual Search, W13564," Incheon, Korea, 2013.

In one or more embodiments, the information on inliers may be stored and passed on to the disambiguation module/circuit 23 to perform the inlier-based comparison.

In one or more embodiments, the disambiguation module/module 23 may compare the corresponding color descriptors for each inlier.

One or more embodiments may operate on compressed (e.g., color) descriptors which may be binary: a Hamming distance may thus used in the place of an Euclidean distance, that is its counterpart for uncompressed descriptors.

In one or more embodiments, every single distance may be summed up to a single distance which is representative of the overall distance of the two images, and the previous retrieved images may be re-ranked.

In one or more embodiments, the top match (that is, the disambiguated result) may be identified as the reference image with the lower distance from the query image.

In one or more embodiments, this disambiguation process may use only inlier points as these are the most "trusted" couples of points between the two images, that is points having the highest probability of describing a same part of the object. In the case of two objects having, with high probability, a similar shape but different colors, the color descriptors associated to these points are different, and the disambiguation process may thus assign higher distances (lower ranks) to those kinds of images.

In one or more embodiments, merged-descriptor comparison may involve descriptors merging, as described, e.g., with reference to the system architecture exemplified in FIG. 4. A next step may involve a comparison using, e.g., the Euclidean distance between the resulting merged vectors, or the Hamming distance in case of binary descriptors. Comparison may thus occur between mixed descriptors (luma+color).

In one or more embodiments disambiguation may thus involve the following:
  merging (fusing) luma and color descriptors;
  comparison of merged descriptors;
  geometric consistency check (e.g., using DISTRAT as exemplified in reference [1] "CDVS. Test Model 6: Compact Descriptors for Visual Search, W13564," Incheon, Korea, 2013, or RANSAC as exemplified in reference M. A. Fischler and R. C. Bolles, "Random sample consensus: a paradigm for model fitting with applications to image analysis and automated cartography," *Communications of the ACM*, vol. 24, no. 6, pp. 381-395, 1981;
  re-ranking of previous retrieved images (e.g., according to the new f-score as exemplified in reference [1] "CDVS. Test Model 6: Compact Descriptors for Visual Search, W13564," Incheon, Korea, 2013) produced considering the new consistency check.

While a disambiguation module/circuit 23 is explicitly shown only in the system architectures as exemplified in FIGS. 1 and 5, such a module/circuit may be regarded as included implicitly in the retrieval module/circuit 20 in the system architecture of FIG. 4.

Receiver Module/Circuit 16

In one or more embodiments a receiver module/circuit may be provided to receive from a server S information about the objects recognized. This module/circuit may be placed client-side (e.g., in the mobile device UE) so that such information may processed and (multimedia) contents related to the recognized object be presented (e.g., displayed) to the user of the mobile device.

For example, if the object is a product available to be purchased, this module/circuit may be configured to access a web marketplace and add the identified product to the online cart.

Similarly for example, if the object is a building, the receiver/presentation module/circuit may be configured to present information about, e.g., the history of the building, the location within the city, a video with a virtual guide, and so on.

A practical implementation of one embodiment substantially as exemplified in FIG. 1 may adopt FBLog as disclosed, e.g., in reference F. Wang, L.-Y. Duan, J. Chen, Q. Huang, T. Huang, C. A. Kot, and W. Gao, "m28891 Peking University Response to CE2: Frequency Domain Interest Point Detector," Incheon, Korea, as the keypoint detector 10 to detect features and extract luma (grayscale) descriptors of a query image I, which are compressed (see 12 in FIG. 1) and sent to the server S.

The retrieval module/circuit 20 in the server S compares the luma descriptors 12 extracted from the query image with those contained into the database DB and returns a list of candidate matching objects.

If this list contains more than one image, color descriptors computed over the query image I and compressed (see 14 in FIG. 1) in the mobile device UE are sent to the server S. There, in the module/circuit 23, an inlier-based comparison of color descriptors is performed on the images of the list of candidate matching objects and the images get re-ranked. The object with the higher similarity rank is considered to be the right one.

For instance, such a color-based disambiguation process may be performed on a query image and a list of reference images of the retrieved object, that are given a score rank>0 by the retrieval module by resorting to the score assignment procedure described in reference "CDVS. Test Model 6: Compact Descriptors for Visual Search, W13564," Incheon, Korea, 2013.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    extracting, using a mobile communication device, grayscale descriptors of a query image;
    sending compressed grayscale descriptors based on the extracted grayscale descriptors from said mobile communication device to a server; and
    distinguishing at least some search results of a search, performed using the compressed grayscale descriptors, of a data base by the server, the distinguishing the at least some search results including at least one of:
        extracting color descriptors from the query image using the mobile communication device, sending compressed color descriptors from the mobile communication device to the server and receiving distinguished search results from the server, the distinguished search results being based at least on the compressed color descriptors; and
        receiving the search results from the server, extracting color descriptors from the query image using the mobile communication device, and distinguishing, using the mobile communication device, the received search results based on the extracted color descriptors, wherein when the search results based on the compressed grayscale descriptors of the query image include plural results, the search results based on the compressed grayscale descriptors of the query image are distinguished based on the extracted color descriptors.

2. The method of claim 1 wherein the method comprises:
    receiving at said mobile communication device a message indicating the search results of said search in said data base are to be distinguished;
    responding to the message by extracting at said mobile communication device said color descriptors of the query image and sending compressed color descriptors based on the extracted color descriptors from said mobile communication device to said server; and
    receiving the distinguished search results from the server, the distinguished search results being based at least on the compressed color descriptors.

3. The method of claim 1, comprising:
    when the search results are to be distinguished, after sending the compressed grayscale descriptors to the server, sending compressed color descriptors based on the extracted color descriptors from the mobile communication device to the server; and
    receiving distinguished search results from the server, the distinguished search results being based on the compressed color descriptors.

4. The method of claim 1, comprising:
    sending compressed, merged grayscale and color descriptors from the mobile communication device to the server; and
    when the search results are to be distinguished, receiving at said mobile communication device search results distinguished by the server based on the compressed, merged grayscale and color descriptors.

5. The method of claim 1 wherein when the search results of a search of the data base based on compressed grayscale descriptors of the query image are not to be distinguished, color descriptors of the query image are not extracted from the query image.

6. The method of claim 1 wherein when search results of a search of the data base based on compressed grayscale descriptors of the query image are not to be distinguished, compressed color descriptors of the query image are not sent from the mobile communication device to the server.

7. A device, comprising:
    one or more memories; and
    circuitry coupled to the one or more memories, which, in operation,
        extracts grayscale descriptors the query image;
        outputs compressed grayscale descriptors based on the extracted grayscale descriptors; and
        distinguishes at least some search results of a search, performed using the compressed grayscale descriptors, of a data base by:
            extracting color descriptors from the query image, and at least one of:
                outputting compressed color descriptors based on the extracted color descriptors and receiving distinguished search results, the distinguished search results being based at least on the compressed color descriptors; and
                receiving the search results to be distinguished and distinguishing the received search results based on the extracted color descriptors, wherein when the search results based on the compressed grayscale descriptors of the query image include plural results, the search results based on the compressed grayscale descriptors of the query images are distinguished based on the extracted color descriptors.

8. The device of claim 7 wherein the circuitry, in operation,
    responds to a message indicating the search results of a search in the data base are to be distinguished by extracting the color descriptors and outputting compressed color descriptors based on the extracted color descriptors to a server; and
    receives distinguished search results from the server, the distinguished search results being based at least on the compressed color descriptors.

9. The device of claim 7 wherein the circuitry, in operation,
    after outputting the compressed grayscale descriptors, sends compressed color descriptors based on the extracted color descriptors; and
    when the search results are to be distinguished, receives distinguished search results from a server, the distinguished search results being based on the outputted compressed color descriptors.

10. The device of claim 7 wherein the circuitry, in operation,
    outputs compressed, merged grayscale and color descriptors; and
    when the search results are to be distinguished, receives search results distinguished based on the compressed, merged grayscale and color descriptors.

11. The device of claim 7 wherein when search results of a search of the data base based on compressed grayscale descriptors of the query image are not to be distinguished, the circuitry, in operation, does not extract color descriptors of the query image.

12. The device of claim 7 wherein when search results of a search of the data base based on compressed grayscale descriptors of the query image are not to be distinguished, the circuitry, in operation, does not output compressed color descriptors of the query image.

13. A non-transitory computer-readable medium including program instructions which when executed cause a communication apparatus to perform a method, the method comprising:
   extracting grayscale descriptors of a query image;
   outputting compressed grayscale descriptors of the query image based on the extracted grayscale descriptors; and
   distinguishing at least some search results of a search, performed using the compressed grayscale descriptors, of a data base, the distinguishing the at least some search results including at least one of:
      outputting compressed color descriptors and receiving distinguished search results based on the outputted compressed color descriptors; and
      receiving the search results to be distinguished and distinguishing the received search results to be distinguished based on color descriptors extracted from the query image, wherein when the search results based on the compressed grayscale descriptors of the query image include plural results, the search results based on the compressed grayscale descriptors of the query image are distinguished based on the extracted color descriptors.

14. The medium of claim 13 wherein the method comprises:
   responding to a received message indicating the search results of said search in said data base are to be distinguished by extracting color descriptors of the query image and outputting compressed color descriptors based on the extracted color descriptors; and
   receiving distinguished search results, the distinguished search results being based at least on the compressed color descriptors.

15. The medium of claim 13 wherein the method comprises:
   after outputting the compressed grayscale descriptors to a server, outputting compressed color descriptors based on extracted color descriptors of the query image; and
   receiving distinguished search results based on the compressed color descriptors.

16. The medium of claim 13 wherein the method comprises:
   outputting compressed, merged grayscale and color descriptors; and
   receiving search results distinguished by a server based on the compressed, merged grayscale and color descriptors.

17. The medium of claim 13 wherein when search results of a search of the data base based on compressed grayscale descriptors of the query image are not to be distinguished, color descriptors of the query image are not extracted from the query image.

18. The medium of claim 13 wherein when search results of a search of the data base based on compressed grayscale descriptors of the query image are not to be distinguished, compressed color descriptors of the query image are not output.

19. A system, comprising:
   one or more memories; and
   circuitry which, in operation,
      extracts grayscale descriptors of a query image;
      extracts color descriptors of the query image;
      outputs compressed grayscale descriptors of the query image;
      distinguishes at least some search results based on compressed grayscale descriptors of the query image, and
      provides content based on at least one of:
         received distinguished search results which are based on compressed color descriptors of the query image output by the circuitry; and
         received search results to be distinguished and distinguishing the received search results to be distinguished based on color descriptors extracted from the query image by the circuitry,
   wherein when the search results based on the compressed grayscale descriptors of the query image include plural results, the search results based on the compressed grayscale descriptors of the query image are distinguished based on the extracted color descriptors.

20. The system of claim 19, comprising:
   an image capture device coupled to the circuitry.

21. The system of claim 20, comprising:
   a display, which, in operation, displays the provided content.

* * * * *

UNITED STATES PATENT AND TRADEMARK OFFICE
CERTIFICATE OF CORRECTION

PATENT NO. : 9,910,864 B2
APPLICATION NO. : 14/602113
DATED : March 6, 2018
INVENTOR(S) : Danilo Pietro Pau et al.

It is certified that error appears in the above-identified patent and that said Letters Patent is hereby corrected as shown below:

In the Claims

Column 20, Line 30, Claim 7:
"images" should read, --image--.

Column 22, Line 24, Claim 19:
"image," should read, --image;--.

Signed and Sealed this
Thirteenth Day of October, 2020

Andrei Iancu
*Director of the United States Patent and Trademark Office*